(12) United States Patent
Nagori et al.

(10) Patent No.: US 12,047,590 B2
(45) Date of Patent: Jul. 23, 2024

(54) TRANSMISSION BIT-RATE CONTROL IN A VIDEO ENCODER

(71) Applicant: Texas Instruments Incorporated, Dallas, TX (US)

(72) Inventors: Soyeb Nagori, Bangalore (IN); Naveen Srinivasamurthy, Bangalore (IN); Anurag Jain, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/892,548

(22) Filed: Aug. 22, 2022

(65) Prior Publication Data

US 2022/0394280 A1 Dec. 8, 2022

Related U.S. Application Data

(63) Continuation of application No. 16/934,274, filed on Jul. 21, 2020, now Pat. No. 11,451,799, which is a (Continued)

(30) Foreign Application Priority Data

Nov. 6, 2009 (IN) .......................... 2715/CHE/2009

(51) Int. Cl.
*H04N 19/184* (2014.01)
*H04N 19/124* (2014.01)
(Continued)

(52) U.S. Cl.
CPC ......... *H04N 19/184* (2014.11); *H04N 19/124* (2014.11); *H04N 19/146* (2014.11); *H04N 19/149* (2014.11); *H04N 19/15* (2014.11); *H04N 19/152* (2014.11); *H04N 19/159* (2014.11); *H04N 19/172* (2014.11);
(Continued)

(58) Field of Classification Search
CPC .. H04N 19/124; H04N 19/146; H04N 19/149; H04N 19/15; H04N 19/152; H04N 19/159; H04N 19/172; H04N 19/176; H04N 19/184; H04N 19/196; H04N 19/198; H04N 19/70
See application file for complete search history.

(56) References Cited

U.S. PATENT DOCUMENTS

| 6,763,138 B1 * | 7/2004 | Yokoyama | H04N 19/14 |
| | | | 375/E7.134 |
| 2001/0006562 A1 * | 7/2001 | Tajime | H04N 19/176 |
| | | | 375/E7.181 |

(Continued)

*Primary Examiner* — Maria E Vazquez Colon
(74) *Attorney, Agent, or Firm* — Carl G. Peterson; Frank D. Cimino

(57) ABSTRACT

A video encoder receives a minimum number of bits (MIN) and a maximum number of bits (MAX) to be used to encode a segment of a sequence of image frames, the segment including a set of pictures contained in the sequence of image frames. The video encoder encodes the set of pictures using a total number of bits greater than the minimum number of bits (MIN), and not exceeding the maximum number of bits (MAX). Thus, the transmission bit-rate of the video encoder can be constrained to lie within a maximum and minimum rate. In an embodiment, the constraints are enforced over relatively short time intervals.

20 Claims, 5 Drawing Sheets

Related U.S. Application Data continuation of application No. 14/934,145, filed on Nov. 5, 2015, now Pat. No. 10,764,591, which is a continuation of application No. 12/938,397, filed on Nov. 3, 2010, now abandoned.

(51) Int. Cl.
  *H04N 19/146* (2014.01)
  *H04N 19/149* (2014.01)
  *H04N 19/15* (2014.01)
  *H04N 19/152* (2014.01)
  *H04N 19/159* (2014.01)
  *H04N 19/172* (2014.01)
  *H04N 19/176* (2014.01)
  *H04N 19/196* (2014.01)
  *H04N 19/70* (2014.01)

(52) U.S. Cl.
  CPC ......... *H04N 19/176* (2014.11); *H04N 19/196* (2014.11); *H04N 19/198* (2014.11); *H04N 19/70* (2014.11)

(56) References Cited

U.S. PATENT DOCUMENTS

| | | | |
|---|---|---|---|
| 2002/0012395 A1* | 1/2002 | Song | H04N 19/132 375/E7.218 |
| 2004/0037357 A1* | 2/2004 | Bagni | G06T 9/007 375/240.03 |
| 2005/0084007 A1 | 4/2005 | Lightstone et al. | |
| 2010/0111163 A1 | 5/2010 | Yang et al. | |
| 2011/0176606 A1 | 7/2011 | Fuchie | |

* cited by examiner

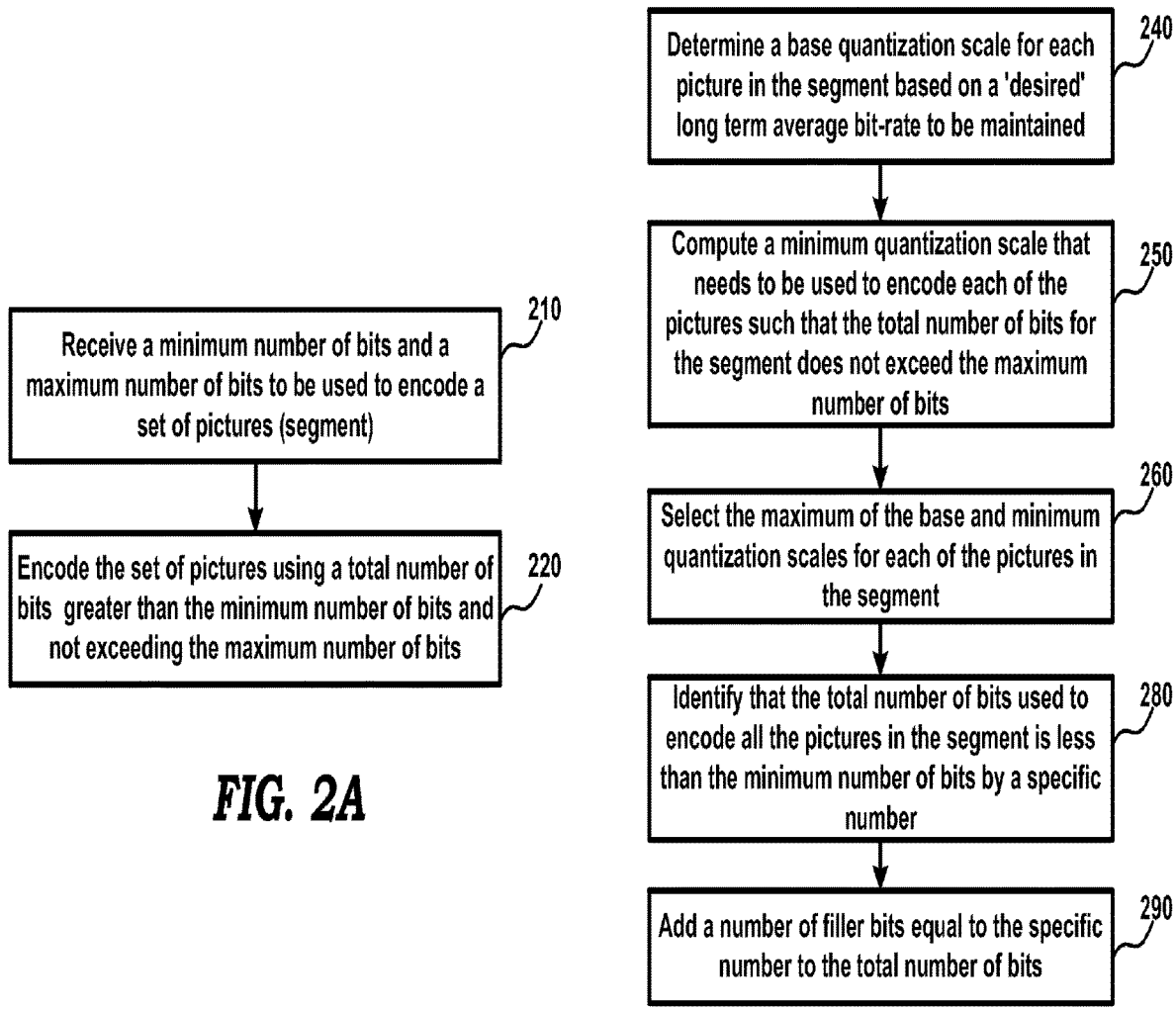

Generation Order
(In Time)

TRANSMISSION BIT-RATE CONTROL IN A VIDEO ENCODER

RELATED APPLICATION(S)

This application is a continuation of U.S. patent application Ser. No. 16/934,274, filed Jul. 21, 2020, which is a continuation of U.S. patent application Ser. No. 14/934,145, filed Nov. 5, 2015 (now U.S. Pat. No. 10,764,591), which is a continuation of U.S. patent application Ser. No. 12/938,397, filed Nov. 3, 2010, which claims the benefit of India provisional application serial number: 2715/CHE/2009, entitled: "BIT ALLOCATION FOR OPTIMUM VIDEO QUALITY," filed on Nov. 6, 2009, all of which are incorporated herein by reference in their entirety.

BACKGROUND

Technical Field

Embodiments of the present disclosure relate generally to video encoding, and more specifically to transmission bit-rate control in a video encoder.

Related Art

Video encoding generally refers to operation(s) performed to encode a sequence of image frames into a form suitable for transmission on a communication channel and/or storage in a storage device, and may include operations such as compression, encryption, quantization, etc. Generally, image frames are encoded into a sequence of bits.

Transmission bit-rate control refers to control of various encoding parameters and/or decisions in a video encoder to control the number of bits that are transmitted in a unit time from a video encoder. Different operating scenarios, such as for example communication channel characteristics, etc., may demand different approaches to transmission bit-rate control.

SUMMARY

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

A video encoder receives a minimum number of bits (MIN) and a maximum number of bits (MAX) to be used to encode a segment of a sequence of image frames. The segment includes a set of pictures contained in the sequence of image frames. The video encoder encodes the set of pictures using a total number of bits greater than the minimum number of bits (MIN), and not exceeding the maximum number of bits (MAX).

Several embodiments of the present disclosure are described below with reference to examples for illustration. It should be understood that numerous specific details, relationships, and methods are set forth to provide a full understanding of the embodiments. One skilled in the relevant art, however, will readily recognize that the techniques can be practiced without one or more of the specific details, or with other methods, etc.

BRIEF DESCRIPTION OF THE VIEWS OF DRAWINGS

Example embodiments will be described with reference to the accompanying drawings briefly described below.

FIG. 2A is a flow diagram illustrating the manner in which transmission bit-rate is controlled in a video encoder, in an embodiment.

FIG. 2B is a flow diagram illustrating the manner in which transmission bit rate in a video encoder is controlled between a minimum number of bits and a maximum number of bits in an embodiment.

The drawing in which an element first appears is indicated by the leftmost digit(s) in the corresponding reference number.

DETAILED DESCRIPTION

Various embodiments are described below with several examples for illustration.

1. Example Device

Figure 1:
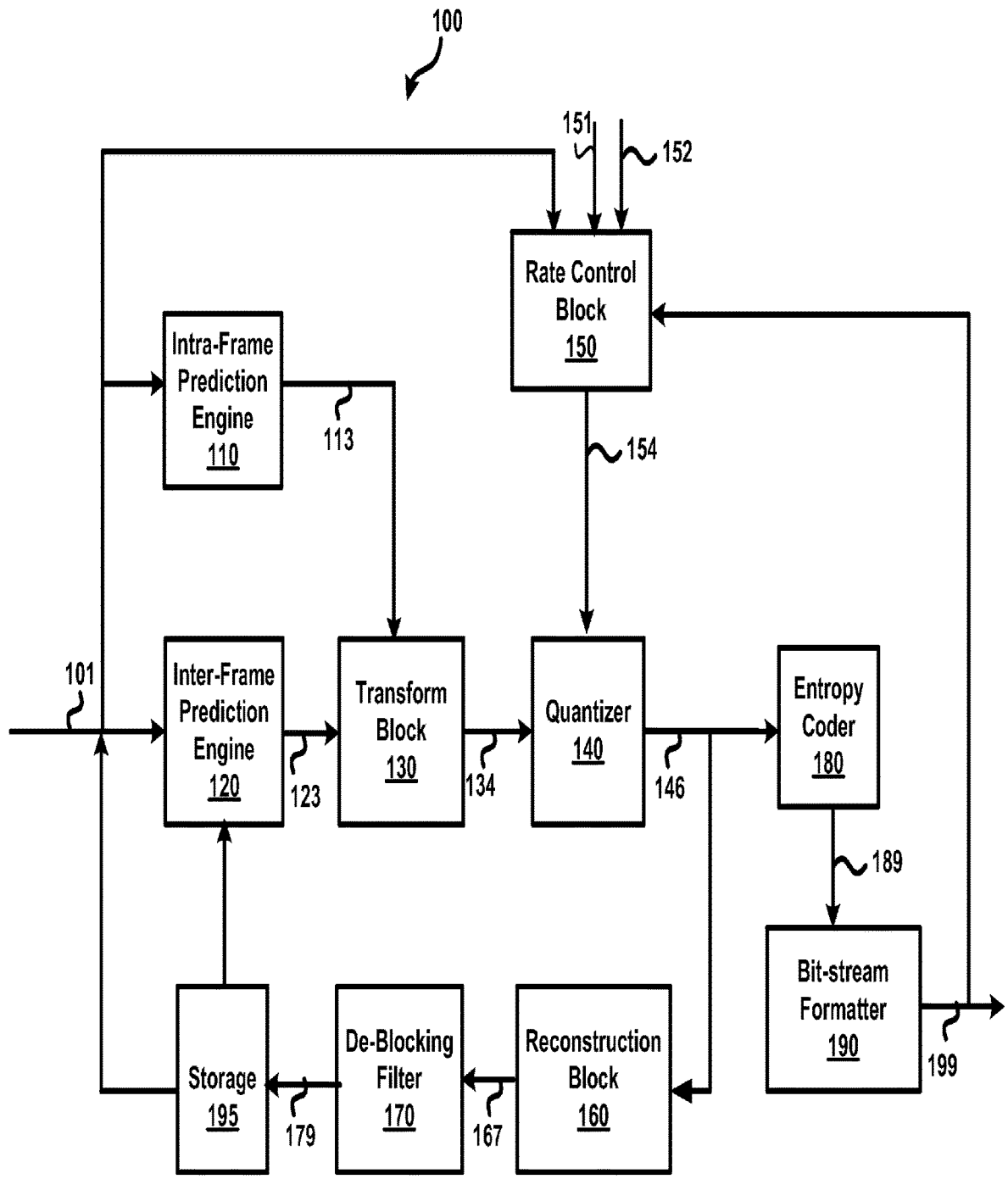
FIG. 1 is a block diagram illustrating the details of an example device in which several embodiments can be implemented.

FIG. 1 is a block diagram illustrating the details of an example device in which several embodiments can be implemented. Video encoder 100 is shown containing intra-frame prediction engine 110, inter-frame prediction engine 120, transform block 130, quantizer 140, rate control block 150, reconstruction block 160, de-blocking filter 170, entropy coder 180, bit-stream formatter 190 and storage 195. The details of video encoder 100 of FIG. 1 are meant merely to be illustrative, and real-world implementation may contain more blocks/components and/or different arrangement of the blocks/components. Video encoder 100 receives image frames (representing video) to be encoded on path 101, and generates a corresponding encoded frame (in the form of an encoded bit-stream) on path 199.

One or more of the blocks of video encoder 100 may be designed to perform video encoding consistent with one or more specifications/standards, such as H.261, H.263, H.264/AVC, in addition to being designed to provide short term bit rate constraints during video encoding in a video encoder as described in detail in sections below. The relevant portions of the H.264/AVC standard noted above are available from the International Telecommunications Union as ITU-T Recommendation H.264, "ITU-T Rec. H.264 and ISO/IEC 14496-10 (MPEG4-AVC), "Advanced Video Coding for Generic Audiovisual Services," v1, May, 2003; v2, January 2004; v3, September 2004; v4, July 2005."

In video encoding, an image frame is typically divided into several blocks termed macro-blocks, and each of the macro-blocks is then encoded using spatial and/or temporal compression techniques. The compressed representation of a macro-block may be obtained based on similarity of the macro-block with other macro-blocks in the same image frame (the technique being termed intra-frame prediction), or based on similarity with macro-blocks in other (reference) frames (the technique being termed inter-frame prediction). Inter-frame prediction of macro-blocks in an image frame may be performed using a single reference frame that occurs earlier than the image frame in display (or frame generation) order, or using multiple reference frames occurring earlier or later in the display order.

The term "picture" as used herein represents either a whole image frame or portions (e.g., fields) thereof. The pictures encoded using intra-frame prediction techniques are referred to as I-type pictures, while pictures encoded using inter-frame prediction techniques are referred to as P-type pictures or B-type pictures (based on whether the macro-blocks in the pictures are encoded based on a single reference picture or multiple reference pictures respectively).

Referring to FIG. 1, a picture received on path 101 may be processed by either intra-frame prediction engine 110 or inter-frame prediction engine 120 or both, depending on whether an intra-coded picture (I-type picture) or inter-predicted picture (P-type picture or B-type picture) is to be provided to transform block 130. The pictures received on path 101 may be retrieved from a storage device (for example, storage 195 or other storage device(s) connected to path 101, but not shown), and may be in (YCbCr) format. Alternatively, the pictures may be provided in (RGB) format, and converted (YCbCr) format internally in the corresponding blocks (blocks 110 and/or 120) prior to further processing.

Intra-frame prediction engine 110 receives pictures on path 101. Intra-frame prediction engine 110 operates to encode macro-blocks of a received picture based on other macro-blocks in the same picture. Intra-frame prediction engine 110 thus uses spatial compression techniques to encode received pictures. The specific operations to encode the pictures may be performed consistent with the standard(s) noted above. Intra-frame prediction engine 110 may operate to determine correlation between macro-blocks in the picture. A macro-block determined to have high correlation (identical or near-identical content) with another (reference) macro-block may be represented by identifiers of the reference macro-block, the location of the macro-block in the picture with respect to the reference macro-block, and the differences (termed residual) between pixel values of the two macro-blocks. Intra-frame prediction engine 110 forwards the compressed representation of a macro-block thus formed, on path 113. For macro-blocks that are determined not to have high correlation with any other macro-block in the received picture, intra-frame prediction engine 110 forwards the entire (uncompressed) macro-block contents (for example, original Y, Cb, Cr pixel values of pixels of the macro-block) on path 113.

Inter-frame prediction engine 120 receives pictures on path 101, and operates to encode the pictures as P-type pictures or B-type pictures. Inter-frame prediction engine 120 encodes macro-blocks of a picture to be encoded as a P-type picture based on comparison with macro-blocks in a 'reference' picture that occurs earlier than the picture in display order. Inter-frame prediction engine 120 encodes macro-blocks of a picture to be encoded as a B-type pictures based on comparison with macro-blocks in a 'reference' picture that occurs earlier, later or both, compared to the picture in display order. The reference picture refers to a picture which is reconstructed after passing the output of the quantizer 140 through the reconstruction block 160 and de-blocking 170 before storing in storage 195.

Reconstruction block 160 receives compressed and quantized pictures on path 146, and operates to reconstruct the pictures to generate reconstructed pictures. The operations performed by reconstruction block 160 may be the reverse of the operations performed by the combination of blocks 110, 120, 130 and 140, and may be designed to be identical to those performed in a video decoder that operates to decode the encoded pictures transmitted on path 199. Reconstruction block 160 forwards reconstructed I-type pictures, P-type pictures and B-type pictures on path 167 to de-blocking filter 170.

De-blocking filter 170 operates to remove visual artifacts that may be present in the reconstructed macro-blocks received on path 167. The artifacts may be introduced in the encoding process due, for example, to the use of different modes of encoding such as I-type, P-type or B-type. Artifacts may be present, for example, at the boundaries/edges of the received macro-blocks, and de-blocking filter 170 operates to smoothen the edges of the macro-blocks to improve visual quality.

Transform block 130 transforms the residuals received on paths 113 and 123 into a compressed representation, for example, by transforming the information content in the residuals to frequency domain. In an embodiment, the transformation corresponds to a discrete cosine transformation (DCT). Accordingly, transform block 130 generates (on path 134) coefficients representing the magnitudes of the frequency components of residuals received on paths 113 and 123. Transform block 130 also forwards, on path 134, motion vectors (received on paths 113 and 123) to quantizer 140.

Quantizer 140 divides the values of coefficients corresponding to a macro-block (residual) by a quantization scale (Qs). Quantization scale is an attribute of a quantization parameter and can be derived from it. In general, the operation of quantizer 140 is designed to represent the coefficients by using a desired number of quantization steps, the number of steps used (or correspondingly the value of Qs or the values in the scaling matrix) determining the number of bits used to represent the residuals. Quantizer 140 receives the specific value of Qs (or values in the scaling matrix) to be used for quantization from rate control block 150 on path 154. Quantizer 140 forwards the quantized coefficient values and motion vectors on path 146.

Rate control block 150 receives pictures on path 101, and a 'current' transmission bit-rate from path 199, and operates to determine a quantization scale to be used for quantizing transformed macro-blocks of the pictures. The quantization scale is computed based on inputs received on paths 151 and 152, as described in detail below. As is well know, the quantization scale is inversely proportional to the number of bits used to quantize a picture, with a smaller quantization scale value resulting in a larger number of bits and a larger value resulting in a smaller number of bits. Rate control block 150 provides the computed quantization scale on path 154.

Entropy coder 180 receives the quantized coefficients as well as motion vectors on path 146, and allocates codewords to the quantized transform coefficients. Entropy coder 180 may allocate codewords based on the frequencies of occurrence of the quantized coefficients. Frequently occurring values of the coefficients are allocated codewords that require fewer bits for their representation, and vice versa. Entropy coder 180 forwards the entropy-coded coefficients as well as motion vectors on path 189.

Bit-stream formatter 190 receives the compressed, quantized and entropy-coded output 189 (referred to as a bit-stream, for convenience) of entropy coder 180, and may include additional information such as headers, information to enable a decoder to decode the encoded picture, etc., in the bit-stream. Bit-stream formatter 190 may transmit on path 199, or store locally, the formatted bit-stream representing encoded pictures.

Assuming that video encoder 100 is implemented substantially in software, the operations of the blocks of FIG. 1 may be performed by appropriate software instructions executed by one or more processors (not shown). In such an embodiment, storage 195 may represent a memory element contained within the processor. Again, such an embodiment, in addition to the processor, may also contain off-chip components such as external storage (for example, in the form of non-volatile memory), input/output interfaces, etc. In yet another embodiment, some of the blocks of FIG. 1 are implemented as hardware blocks, the others being implemented by execution of instructions by a processor.

It may be appreciated that the number of bits used for encoding (and transmitted on path 199) each of the pictures received on path 101 may be determined, among other considerations, by the quantization scale value(s) used by quantizer 140. According to a prior approach, rate control block 150 determines the quantization scale values such that the average number of bits used to encode pictures over a long duration (for example, over several hundreds of frames) is maintained approximately equal to some predetermined desired value.

However, there may be several scenarios in which the transmission bit-rate in video encoder 100 may need to be controlled based on other considerations. For example, for very low bit-rate bandwidth constrained applications there is a need for maintaining "instantaneous" (or short term, i.e., over a fewer number of frames, for example of the order of 25 to 30 frames) bit-rate almost constant (constrained between maximum and minimum bit-rates).

Several techniques employed in video encoder 100 are designed to provide control over transmission bit-rates constraints during video encoding, as described below.

FIG. 2A is a flow diagram illustrating the manner in which transmission bit-rate is controlled in a video encoder, in an embodiment. The flow diagram is described with respect to video encoder 100 of FIG. 1, merely for illustration. However, various features described herein can be implemented in other devices and/or environments and using other components, as will be apparent to one skilled in the relevant arts by reading the disclosure provided herein. Further, the steps in the flow diagram are described in a specific sequence merely for illustration. Alternative embodiments using a different sequence of steps can also be implemented without departing from the scope and spirit of several aspects of the present disclosure, as will be apparent to one skilled in the relevant arts by reading the disclosure provided herein.

In step 210 according to the flow diagram, video encoder 100 receives a minimum number of bits (MIN) and maximum number of bits (MAX) to be used to encode a set of pictures (referred to as a segment) in the sequence of image frames sought to be encoded. MIN and MAX represent the lower and upper limits of a bit-rate range that needs to be maintained for transmitting the set of pictures. Control then passes to step 220.

In step 220, video encoder 100 encodes the set of pictures using a total number of bits greater than the minimum number of bits (MIN), and not exceeding the maximum number of bits (MAX).

FIG. 2B is a flow diagram illustrating the manner in which transmission bit rate in a video encoder is controlled between a minimum number of bits (MIN) and a maximum number of bits (MAX) in one embodiment. The flow diagram is described with respect to the operation of rate control block 150 of FIG. 1 for one segment of pictures, merely for illustration. However, various features described herein can be implemented in other devices and/or environments and using other components and for multiple segments, as will be apparent to one skilled in the relevant arts by reading the disclosure provided herein. Further, the steps in the flow diagram are described in a specific sequence merely for illustration. Alternative embodiments using a different sequence of steps can also be implemented without departing from the scope and spirit of several aspects of the present disclosure, as will be apparent to one skilled in the relevant arts by reading the disclosure provided herein.

In step 240, according to the flow diagram, rate control block 150 determines a base quantization scale (baseQs) for each picture in the segment based on a 'desired' long term average bit-rate to be maintained. The baseQs values determine the number of bits used to encode each picture in the segment. Control then passes to step 250.

In step 250, rate control block 150 computes a minimum quantization scale (minQs) that needs to be used to encode each of the pictures in the segment such that the total number of bits used to encode all the pictures in the segment does not exceed the MAX limit. The encoding of any of the pictures using a quantization value lesser than the computed minQs will result in a larger number of bits being used for some of the pictures, and thereby cause the MAX limit to be violated for the segment. Control then passes to step 260.

In step 260, rate control block 150 selects the maximum of the determined baseQs and computed minQs for each of the pictures. The selection of the maximum Qs (and correspondingly the lower limit on the number of bits) ensures that the total number of bits used to encode all of the pictures in the segment does not exceed MAX for the segment. Control then passes to step 280.

In step 280, video encoder 100 (or rate control block 150 contained within) identifies that the total number of bits used to encode all the pictures in the segment is less than the MIN limit by a specific number. In step 290, video encoder 100 adds a number of filler bits equal to the specific number to the total number of bits such that the encoding of the set of pictures is performed without violating the MIN limit.

The operations of the steps 240, 250 and 260 of above are illustrated with an example, and with reference to FIG. 1, FIG. 3A, FIG. 3B and FIG. 4.

Figure 3A:
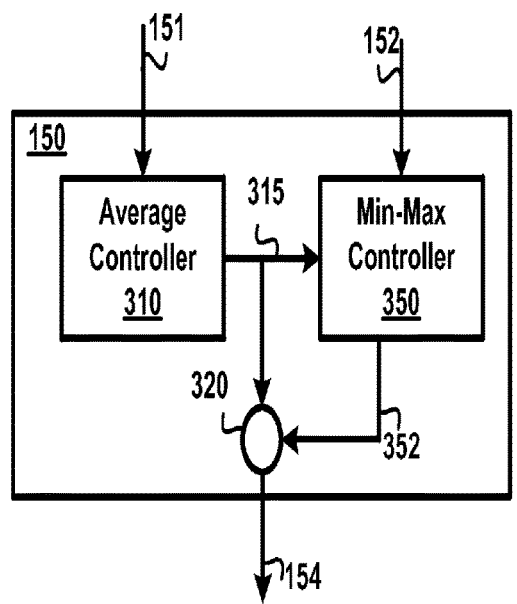
FIG. 3A is a diagram illustrating the details of a rate control block of a video encoder, in an embodiment.

FIG. 3A is a diagram illustrating the details of rate control block 150, in an embodiment. Rate control block 150 is shown containing average controller 310, max operator 320 and min-max controller 350, which operate in combination to calculate the quantization scale (Qs) to be used for each picture.

Average controller 310 receives data specifying a 'desired' long-term average bit-rate to be maintained (for bits transmitted on path 199) via path 151, and computes a base quantization scale (baseQs) to be used for encoding each picture received on path 101.

Min-max controller 350 receives, via path 152, values specifying the short term minimum and maximum bit-rates, the frame rate and a segment size either in terms of the number of pictures or in units of time (e.g., milliseconds) and determines the values of MIN and MAX based on the received values. Min-max controller 350 then computes the minimum quantization scale (minQs) to be used for encoding each picture received on path 101 based on the MAX limit and the baseQs (received via path 315). Min-max controller 350 provides the computed minQs for a picture on path 352.

Max operator 320 determines the maximum of the baseQs and minQs values respectively received from average controller 310 and Min-max controller 350 to ensure that the picture is encoded using the a number of bits less than the maximum number of bits that can be utilized by a picture. The output of max operator 320 is provided to quantizer 140 of FIG. 1 via path 154.

Figure 3B:
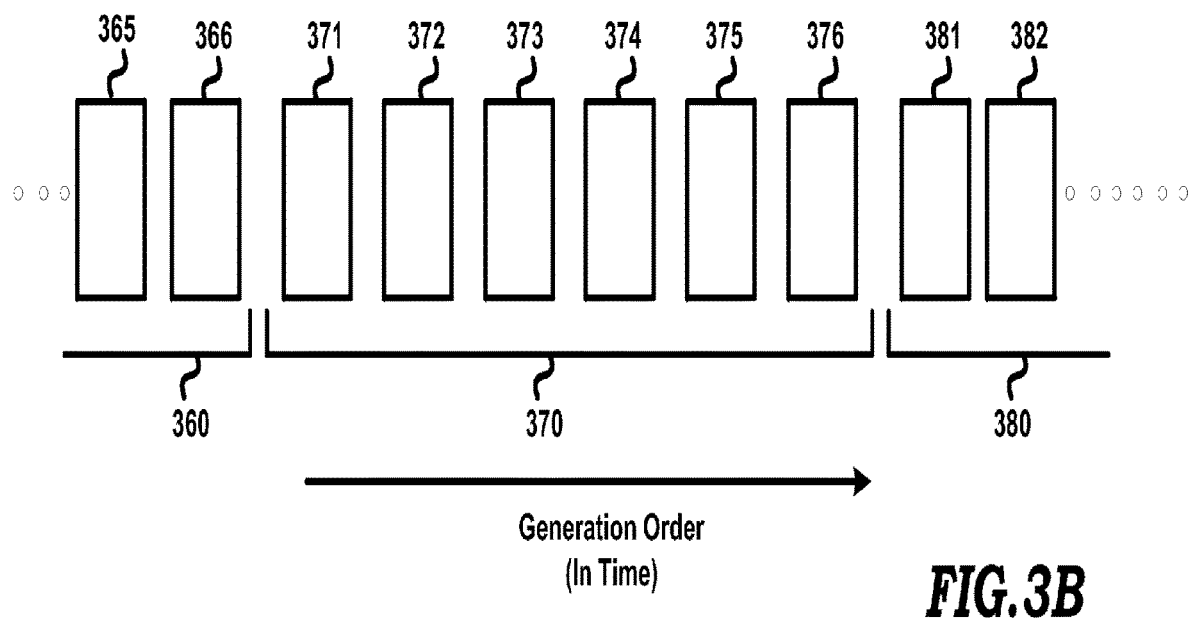
FIG. 3B is a diagram showing a sequence of pictures in generation-order sequence.

FIG. 3B shows a sequence of source pictures in display/generation order sequence, source picture 365 being generated earliest, and source picture 382 being generated last among the pictures shown. It may be appreciated that the number of bits used to encode each of the source pictures may be different due to the complexity of the images sought to be captured/encoded, and the specific encoding technique (I-type, P-type, B-type) used for the source picture.

It may be desirable that the "instantaneous" bit rate constraints be applied for each "segment" (containing a small set of pictures) in the sequence. For example, segment 370 containing 6 pictures 371-376 may need to be encoded using a total number of bits greater than the MIN limit and not exceeding the MAX limit. The description is continued assuming that the segments (e.g., 360, 370 and 380) in the sequence are of the same size (6) and that segment 370 contains one I-type picture (371), three P-type pictures (372-374) and two B-type pictures (375-376). However in alternative embodiments, the segments may be of different sizes (received as inputs via path 152), with each segment having different number of I, P and B type pictures (or having only one type of pictures).

Figure 4:
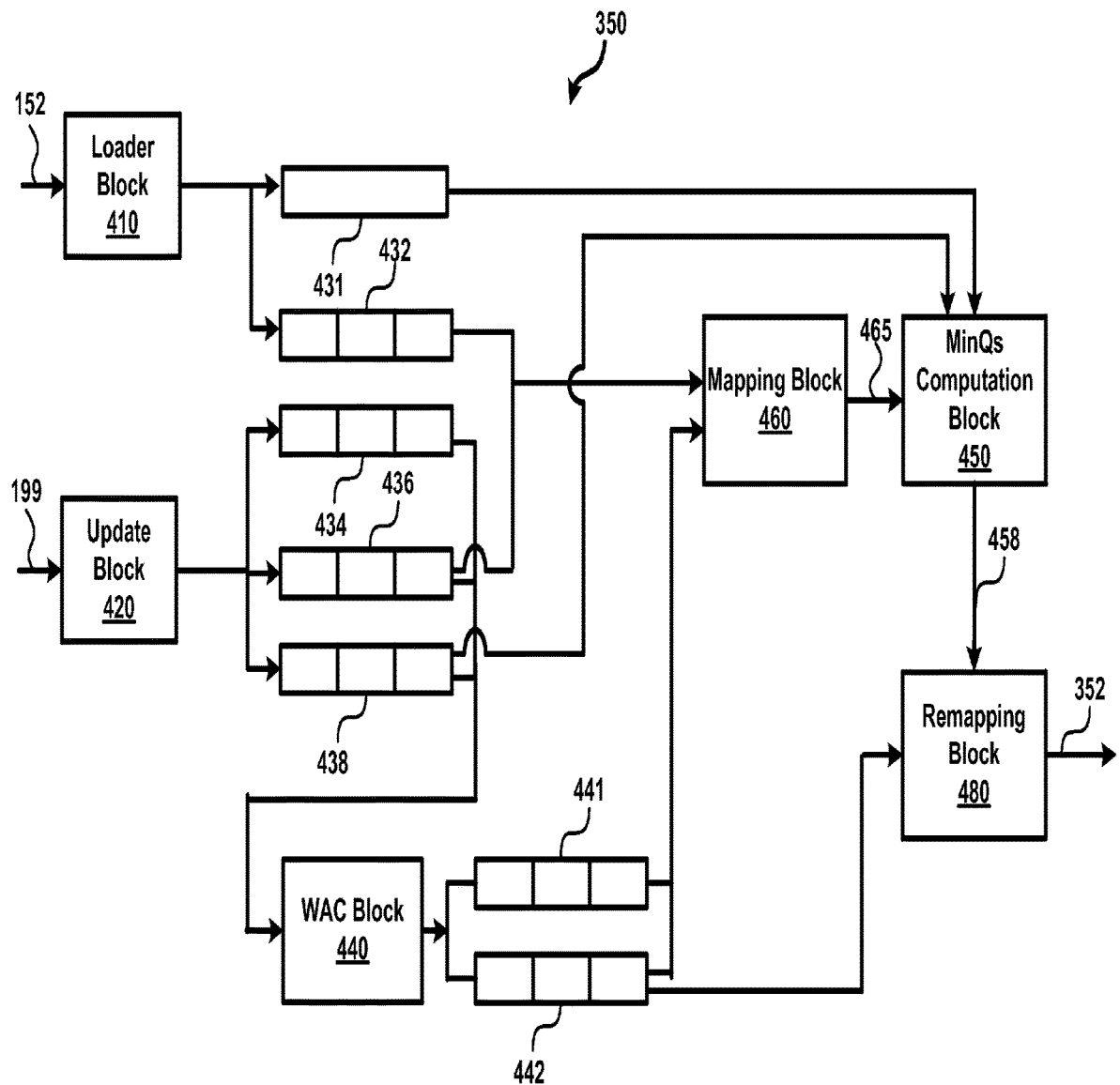
FIG. 4 is a block diagram used to illustrate the operation of a min-max controller contained in a rate control block of a video encoder, in an embodiment.

FIG. 4 is a block diagram used to illustrate the operation of min-max controller 350 in an embodiment. Min-max controller 350 is shown containing loader block 410, update block 420, buffers 431, 432, 434, 436, 438, 441 and 442, weighted average calculation block (WAC) 440, mapping block 460, minimum quantization scale (minQs) computation block 450 and remapping block 480. The details of min-max controller 350 of FIG. 4 are meant merely to be illustrative, and real-world implementation may contain more blocks/components and/or different arrangement of the blocks/components.

Buffer 431 stores the desired maximum number of bits (MAX) for a current segment (370). Each of buffers 432, 434, 436, 438, 441 and 442 stores different parameters of the current segment corresponding to each picture type (I, P and B) and are accordingly shown as an array having three cells. Buffer 432 stores the total number of pictures, buffer 434 stores Qs sums, buffer 436 stores the number of pictures already encoded and buffer 438 stores the number of bits already used for encoding in the current segment 370 for each picture type. Buffer 441 stores the weighted average number of bits of each picture type, while buffer 442 stores weighted average Qs of each picture type for the current segment 370.

Loader block 410 receives (via path 152) the inputs such as the desired minimum bit-rate, maximum bit-rate, etc., determines the maximum number of bits (MAX) for segment 370 and stores MAX in buffer 431. Loader block 410 also receives and/or computes the segment size in terms of the number of pictures (in total and also for each picture type) and stores the corresponding values in buffer 432. For segment 370, loader block 410 may store the values 1, 3 and 2 in the three cells (I, P and B, in that order) of buffer 432.

Loader block 410 also loads empirical values for weighted average number of bits for each picture type in buffer 441 and weighted average Qs for each picture type in buffer 442. The empirical values loaded in buffer 442 take into consideration the differences in the Qs of different picture types, for example, that the Qs for I-type<Qs for P-type<Qs for B-type.

The empirical values loaded in buffer 441 may similarly be chosen. In one embodiment, the empirical values for the weighted average number of bits loaded in buffer 441 is computed as follows:

$$\text{wtdAvBits}[I\_TYPE]=TH\_I\_P*\text{avg\_bits\_pic};$$

$$\text{wtdAvBits}[P\_TYPE]=\text{avg\_bits\_pic};$$

$$\text{wtdAvBits}[B\_TYPE]=\text{avg\_bits\_pic}/TH\_P\_B;$$

Wherein $$TH\_I\_P, TH\_P\_B>1(\text{e.g. } TH\_I\_P=6 \text{ and } TH\_P\_B=2); \text{ and}$$

avg_bits_pic is the target average number of bits used to encode each picture (irrespective of the picture type) over multiple segments.

Update block 420 receives (via path 199) details such as the number of bits, the Qs, and picture type of the most recently encoded picture and updates the values in buffers 434, 436 and 438 (based on the received picture type). In particular, update block 420 adds the received Qs value to the already stored Qs value (for the received picture type) in buffer 434, the received number of bits to the already stored number of bits value (for the received picture type) in buffer 438 and increments by 1 the already stored number of pictures (for the received picture type) in buffer 436. For example, after picture 371 (I-type) is encoded, update block 420 adds the received Qs and number of bits to the I-type cells of respective buffers 434 and 438, and also increments the I-type cell value in buffer 436. Thus, update block 420 maintains (in buffers 434, 436 and 438) the sum of the Qs, number of pictures, and number of bits for each picture type in the current segment (370).

WAC block 440 calculates the weighted average number of bits and the weighted average Qs and for each picture type and stores the calculated values in the respective buffers 441 and 442. The manner in which WAC block 440 calculates the weighted average Qs is first described, followed by the calculation of the weighted average number of bits.

WAC block 440 calculates the weighted average Qs for each picture type based on the sum Qs values stored in buffer 434, and the number of pictures already encoded stored in buffer 436. In one embodiment, the weighted average Qs for each picture type (wtdAvQs[picType]) stored in buffer 441 is computed as follows:

```
FOR(picType = I_TYPE, picType <= B_TYPE; ++picType)
{
    avgQsCurUnit=sumQsInCurUnit[picType]/numPicCodedInUnit[picType];
    wtdAvQs[picType]=(avgQsCurUnit*w1+avgQsInPrevUnit[picType]*w2)/(w1+w2);
}
```

Wherein, picType takes one of the values I-type, P-type and B-type during each iteration of the "FOR" loop;

sumQsInCurUnit[picType] is the sum of Qs in current segment for each picture type stored in buffer 434;

numPicCodedInUnit[picType] is the number of pictures already encoded in the current segment for each picture type stored in buffer 436;

avgQsCurUnit represents the average Qs in current segment (370) for each picture type;

avgQsInPrevUnit[picType] represents the average Qs in a previous segment (360) for each picture type, the previous segment 360 occurring before the current segment 370 in the sequence of image frames (as shown in FIG. 3B); and wand w2 are numbers used for giving weights to the previous and current average Qs values.

It may be appreciated that using the historical values (average Qs) of only the previous picture or segment would be very noisy and sensitive to even the slightest change in the complexity of the video (image frames). The weight average technique used above ensures that such noise is eliminated. In one embodiment, the weights wand w2 are computed as follows:

```
IF (currentUnit is not firstUnit)
{
  w1 = picCodedInThisUnit;
  w2 = totPicInUnit – picCodedInThisUnit;
}
```

Wherein, currentUnit is the current segment being encoded, firstUnit is the first segment in the sequence of image frames encoded by video encoder 100, picCodeIn-ThisUnit is the number of pictures already encoded in the current segment (total of the three values in buffer 436) and totPicInUnit is the total number of pictures in the current segment (total of the three values in buffer 432).

Thus, when encoding picture 372, the values of w1 and w2 are set to 1 and 5, thereby giving more weight to the average Qs of the previous segment (as more information is available). When encoding picture 375, the values of w1 and w2 are set to 4 and 2, thereby giving more weight to the average Qs of the current segment (as more information of the current segment is now available). When the current unit/segment is the first segment in the sequence, the values of w1 and w2 are set to 1 and 0, as there is no previous segment and no information is accordingly available.

Thus, WAC block 440 calculates the weighted average Qs for each picture type and stores the calculated values in buffer 442. In a scenario that no picture of a specific picture type has been encoded (either in the current segment or the previous segment), the average Qs for the previous segment if present (for the specific picture type or for all the pictures) is used as the weighted average Qs.

WAC block 440 also calculate the weighted average number of bits based on the sum number of bits stored in buffer 438 and the number of pictures stored in buffer 436. In one embodiment, the weighted average number of bits for each picture type (wtdAvBits[picType]) is calculated as follows:

```
FOR(picType = I_TYPE, picType <= B_TYPE; ++picType)
{
  avgBitsCurUnit = sumBitsInCurUnit[picType] / numPicCodedInUnit[picType];
  wtdAvBits[picType] = (avgBitsCurUnitI*w1+avgBitsInPrevUnit[picType]*w2)/(w1+w2);
}
```

Wherein, picType takes one of the values I-type, P-type and B-type during each iteration of the "FOR" loop;

sumBitsInCurUnit[picType] is the sum of the number of bits in current segment for each picture type stored in buffer 438;

numPicCodedInUnit[picType] is the number of pictures already encoded in the current segment for each picture type stored in buffer 436;

avgBitsCurUnit represents the average number of bits in current segment (370) for each picture type;

avgBitsInPrevUnit[picType] represents the average number of bits in a previous segment (360) for each picture type, the previous segment 360 occurring before the current segment 370 in the sequence of image frames (as shown in FIG. 3B); and w1 and w2 are numbers used for giving weights to the previous and current average number of bits, and are set to different values as noted above.

Thus, WAC block 440 calculates the weighted average number of bits for each picture type in the current segment 370 and stores the calculated values in buffer 441.

Mapping block 460 converts the values of parameters of the different picture types (I, P or B) into corresponding values for a common picture type. Mapping block 460, accordingly may be viewed as mapping the parameter values for the other picture types to corresponding values in the common picture type. Such a mapping may be desirable as the encoding technique used for each picture type is different, and accordingly the corresponding values of the parameters may be incomparable.

In the description below, the P-type is chosen as the common picture type, though in alternative embodiments, the other picture types may also be chosen as the common picture type. Mapping block 460 accordingly may be viewed as performing the following mappings for Qs:

QsMapped[I_TYPE]=Qs[I_TYPE]*ScaleFactor_I_P;

QsMapped[B_TYPE]=Qs[B_TYPE]*ScaleFactor_B_P;

QsMapped[P_TYPE]=Qs[P_TYPE];

Wherein

ScaleFactor_I_P=wtdAvQs[P_TYPE]/wtdAvQs[I_TYPE]; and

ScaleFactor_B_P=wtdAvQs[P_TYPE]/wtdAvQs[B_TYPE]

Thus, mapping block 460 converts the weighted average number of bits and Qs for each picture type (I, P and B) into the common picture type (P). In one embodiment, the weighted average Qs (avgQsInCurUnit) for the current segment 370 is converted as follows:

```
FOR(picType = I_TYPE; picType <= B_TYPE; ++picType)
{
  sumQsMappedCurUnit+=
    baseQsAvgCurPic*wtdAvQs[P_TYPE]/wtdAvQs[picType];
}
``` avgQsInCurUnit=sumQsMappedCurUnit/numPic-
   CodedInCurUnit;

Wherein, picType takes one of the values I-type, P-type and B-type during each iteration of the "FOR" loop;

sumQsMappedCurUnit is the sum of the mapped Qs in the current segment, and is calculated using the scale factors noted above;

wtdAvQs[picType] is the weighted average Qs for each picture type in the current segment stored in buffer 442;

numPicCodedInCurUnit is the number of pictures coded in current segment, and is the sum of the three values in buffer 436; and baseQsAvgCurPic is the average Qs value for the current picture provided (via path 355) 315) by average controller 310.

Mapping block 460 also maps the number of pictures of each picture type already encoded in the current segment to the corresponding number of P-type pictures. In one embodiment, the number of pictures already encoded in the current segment 370 in terms of P-type pictures (numCodedPicMappedInUnit) is computed as follows:

qFormat=Q_FMT;

numIPicMapped=numPicCodedInUnit[I_TYPE]*wt-
   dAvBits[I_TYPE])<<qFormat)/wtdAvBits
   [P_TYPE];

numBPicMapped=numPicCodedInUnit[B_TYPE]*
   wtdAvBits[B_TYPE])<<qFormat)/wtdAvBits
   [P_TYPE];

numPPicMapped=numPicCodedInUnit[P_
   TYPE])<<qFormat;

numCodedPicMappedInUnit=numIPicMapped+
   numBPicMapped+numPPicMapped;

Wherein, qFormat is used to change fractional quantities into an integer number;

numIPicMapped is the number of I-type pictures encoded in the current segment mapped to the equivalent number of P-type pictures;

numBPicMapped is the number of B-type pictures encoded in the current segment mapped to the equivalent number of P-type pictures;

numPPicMapped is the number of P-type pictures encoded in the current segment;

numPicCodeInUnit[picType] is the number of pictures already encoded for each picture type in the current segment 370 stored in buffer 436; and wtdAvgBits[picType] is the weighted average number of bits for each picture type stored in buffer 441.

Mapping block 460 also maps the total number of pictures in the current segment to the corresponding number of P-type pictures. In one embodiment, the total number of pictures in current segment 370 in terms of P-type pictures (totPicMappedInUnit) is computed by substituting the occurrence of numPicCodedInUnit[picType] with the corresponding parameter totNumPicInUnit [picType] in the above noted equations, the totNumPicInUnit[picType] being the total number of pictures of each picture type in the current segment 370 stored in buffer 432.

Thus, mapping block 460 computes the mapped average Qs (avgQsInCurUnit), the mapped total number of pictures (totPicMappedInUnit) and the mapped number of pictures already encoded (numCodedPicMappedInUnit) for current segment 370. Mapping block 460 then forwards the computed values to MinQs computation block 450 for the computation of the minimum quantization scale to be used for encoding the current picture.

MinQs computation block 450 computes the minimum quantization scale (minQs) that needs to be used to encode the current pictures such that the total number of bits for the current segment 370 does not exceed the maximum number of bits (MAX stored in buffer 431). The minQs for the current picture is computed using the mapped average Qs, the mapped first number of pictures already encoded (numPicMappedInUnit), the mapped second of number of pictures that are yet to be encoded (totPicMappedInUnit−numPicMappedInUnit), the maximum number of bits (MAX) and the current total of number of bits already used to encode the mapped first number of pictures. In one embodiment, the value of the quantization scale for a current picture (minCurPicQs) is computed as follows:

remainingBitsInCurUnit=targetUnitBits−numBits-
   ConsumedInCurUnit;

estErrMargin=(remainingBitsInCurUnit>>5)+(targe-
   tUnitBits>>6);

num=(numBitsConsumedInCurUnit)*(totPic-
   MappedInUnit−numPicMappedInUnit);

den=(targetUnitBits−numBitsConsumedInCurUnit−
   estErrMargin)*numPicMappedInUnit;

minCurPicQs=avgQsInCurUnit*num/den;

Wherein, targetUnitBits is the maximum number of bits (MAX) allowed in the current segment 370 stored in buffer 431;

numBitsConsumedInCurUnit is the total number of bits already used to encode the previous pictures in current segment 370 and is the sum of the three values in buffer 438;

estErrMargin is the estimated error margin in allocation of the bits to each of the pictures in current segment 370 and is computed as around 3% of the remaining bits +1.5% of the maximum number of bits;

totPicMappedInUnit is the total number of pictures in segment 370 in terms of a common picture type (P-type) and is received from mapping block 460 via path 465;

numPicMappedInUnit is the number of pictures already encoded in segment 370 in terms of a common picture type (P-type) and is received from mapping block 460 via path 465;

avgQsInCurUnit is the average Qs of the pictures in segment 370 in terms of a common picture type (P-type) and is received from mapping block 460 via path 465.

Thus, the minimum quantization scale for the current picture is computed by MinQs computation block 450. To avoid drastic increase in Qs values, which may happen if complexity of video is suddenly changing, the minCurPicQs value is capped with the following limit:

maxQsAllowed=addDelta2Quant(max(avgQsInCurUnit, LOWER_QS_RANGE), DELTA_QP_MAXQS);

minCurPicQs=min(minCurPicQs, maxQsAllowed);

Wherein, max is a function that returns the maximum of the two inputs provided;

maxQsAllowed is the maximum quantization allowed for the current picture;

avgQsInCurUnit is the average Qs of the pictures in segment 370 in terms of a common picture type (P-type) and is received from mapping block 460 via path 465; and addDelta2Quant is a function that takes as input a quantization scale and a delta difference in the corresponding quantization parameter value and returns as output a new quantization scale which represents the modification to the input quantization scale due to the delta change in the quantization parameter.

Thus, for higher Qs range (above a threshold value), the maximum quantization scale equivalent of quantization parameter increase of DELTA_QP_MAXQS (pre-defined) with respect to current running average Qs (for P-type pictures) is allowed. For lower Qs range (below a threshold value), larger increase is allowed (due to the max operator). In a scenario that the maximum unit size limit is already violated then that above limit is ignored and the suggested minCurPicQs (computed earlier) is set as that maximum Qs value allowed in the current picture type.

Remapping block 480 maps the minimum quantization scale computed for the current picture (minCurPicQs) to the corresponding picture type when the current picture is of a picture type different from the common picture type (P-type). Such remapping is required since the computation of the minimum quantization scale is performed by mapping all parameters to the common picture type (P-type). Remapping block 480 also clips the remapped quantization values when relative complexity between different picture types is large due to sudden change in complexity of video. In one embodiment, the minimum quantization scale for the other picture types (I and B) are computed as follows:

```
if (picType == B_TYPE) {
   minCurPicQsWtRatio = (minCurPicQs * wtdAvQs[B_TYPE]) /
   wtdAvQs[P_TYPE];
   minCurPicQsFixedRatio = addDelta2Quant(minCurPicQs, deltaQpPB);
   minCurPicQs = min(minCurPicQsWtRatio, minCurPicQsFixedRatio);
}
else if (picType == I_TYPE) {
   minCurPicQsWtRatio = (minCurPicQs * wtdAvQs[I_TYPE]) /
   wtdAvQs[P_TYPE];
   minCurPicQsFixedRatio = addDelta2Quant(minCurPicQs, -deltaQpIP);
   minCurPicQs = max(minCurPicQsWtRatio, minCurPicQsFixedRatio);
}
```

Wherein, min and max are the functions that respectively returns the minimum and maximum of the two inputs provided;

minCurPicQs on the right hand side of the '=' sign is the minimum quantization scale computed for the current picture by MinQs computing block 450 (and received via path 458);

addDelta2Quant is the function described above;

deltaQpPB is the change in the quantization parameter between P and B type pictures;

deltaQpIP is the change in the quantization parameter between I and P type pictures, the unary negation being used to indicate that Qs goes in the opposite direction for I-type pictures as compared to B-type pictures; and wtdAvQs[picType] is the weighted average Qs for each picture type in the current segment stored in buffer 442.

The remapped value of minCurPicQs for the picture type of the current picture is then provided as the output of the min-max controller 350 via path 352. The remapped minCurPicQs value represents the minimum quantization scale (minQs) that needs to be used to encode the current picture to ensure that the total number of bits for the segment does not exceed the maximum number of bits (MAX). As noted above with respect to FIG. 3A, the minQs value on path 352 is provided along with the baseQs determined by average controller 310 on path 315 to max operator 320, which then determines the maximum of the two quantization scales (as output 154) as the quantization scale (finalQs) to be used for encoding the current picture.

Thus, rate control block 150 ensures that pictures in each segment (e.g., 370) are encoded using only a specific number of bits such that the total number of bits used for all the pictures in the segment does not exceed the desired maximum number of bits (MAX). Rate control block 150 may also alter other parameters of video encoder 100 to make them consistent with the minimum and maximum bit rate constraints.

For example, the minimum and maximum Qs parameter allowed for each picture in the sequence may need to be modified. As the finalQs is increased when minCurPicQs is higher than basePicQs suggested by average controller 310, in some situations, the finalQs may be higher than the maximum Qs allowed in the current picture. In this scenario, if the maximum Qs is not increased, actual Qs used will be lower than intended and this may violate the MAX limit. Furthermore, the minimum Qs may also need to be changed, as otherwise average Qs will not be same as base Qs. This is due to the fact that in this scenario, there will be less difference between baseQs of current picture and maximum Qs compared to baseQs and minimum Qs. In one embodiment, the minimum and maximum Qs used for the current picture are changed as follows:

qsMaxNew=addDelta2Quant(minCurPicQs, MAX_DIFF_BET_AVG_MAX QP);

qsMaxNew=min(qsMaxNew, MAX_H264_QS);

```
if(qsMaxNew > qsMax) {
   qsMinNew = addDelta2Quant(minCurPicQs,
   -MAX_DIFF_BET_AVG_MAX_QP);
}
``` qsMax=min(qsMaxNew, qsMax);

qsMin=max(qsMinNew, qsMin);

Another parameter that may need to be changed in video encoder 100 is the maximum picture size (in number of bits) for the current picture. For determining this, the number of bits not yet used to encode is calculated (as MAX−current total number of bits consumed). The maximum picture size for the current picture is then determined such that the remaining pictures in the current segment are allocated at least half the weighted average number of bits. Such a computation ensures that situations in which too many bits are used to encode the current picture resulting in not enough bits for the remaining pictures in the segment are avoided.

Based on the calculated value of the maximum picture size, the value of Qs may be updated by rate control block 150 several times in the current picture (for encoding different macro-blocks), if the maximum picture size is predicted to be violated. However, in the scenario that even after updating Qs several times in the picture, the maximum picture limit cannot be met, then the remaining portions (macro-blocks) of the picture is encoded with highest Qs allowed by the encoding standard (e.g. H264). Furthermore, in the scenario that even after encoding with highest Qs value, the bits used for encoding in the current segment is about to cross maximum number of bits for the segment (MAX), then remaining macro-blocks in the picture are skip-coded to avoid violation of the MAX limit.

Video encoder 100 may be implemented using software, hardware, or a combination of hardware and software. In general, when throughput performance is of primary consideration, the implementation is done more in hardware (e.g., in the form of an application specific integrated circuit). When cost is of primary consideration, the implementation is performed more in software (e.g., using a processor executing instructions provided in software/firmware). Cost and performance can be balanced by employing a mix of hardware, software and/or firmware. Some of the implementation approaches noted above may be designed to incorporate at least some degree of parallelism or pipelining. For example, when the implementation is substantially in software, some of the time-critical and/or compute-intensive operations may be executed by dedicated hardware units, with the less time-critical and/or less compute-intensive operations being executed by software instructions. An example embodiment implemented substantially in software is described next.

Figure 5:
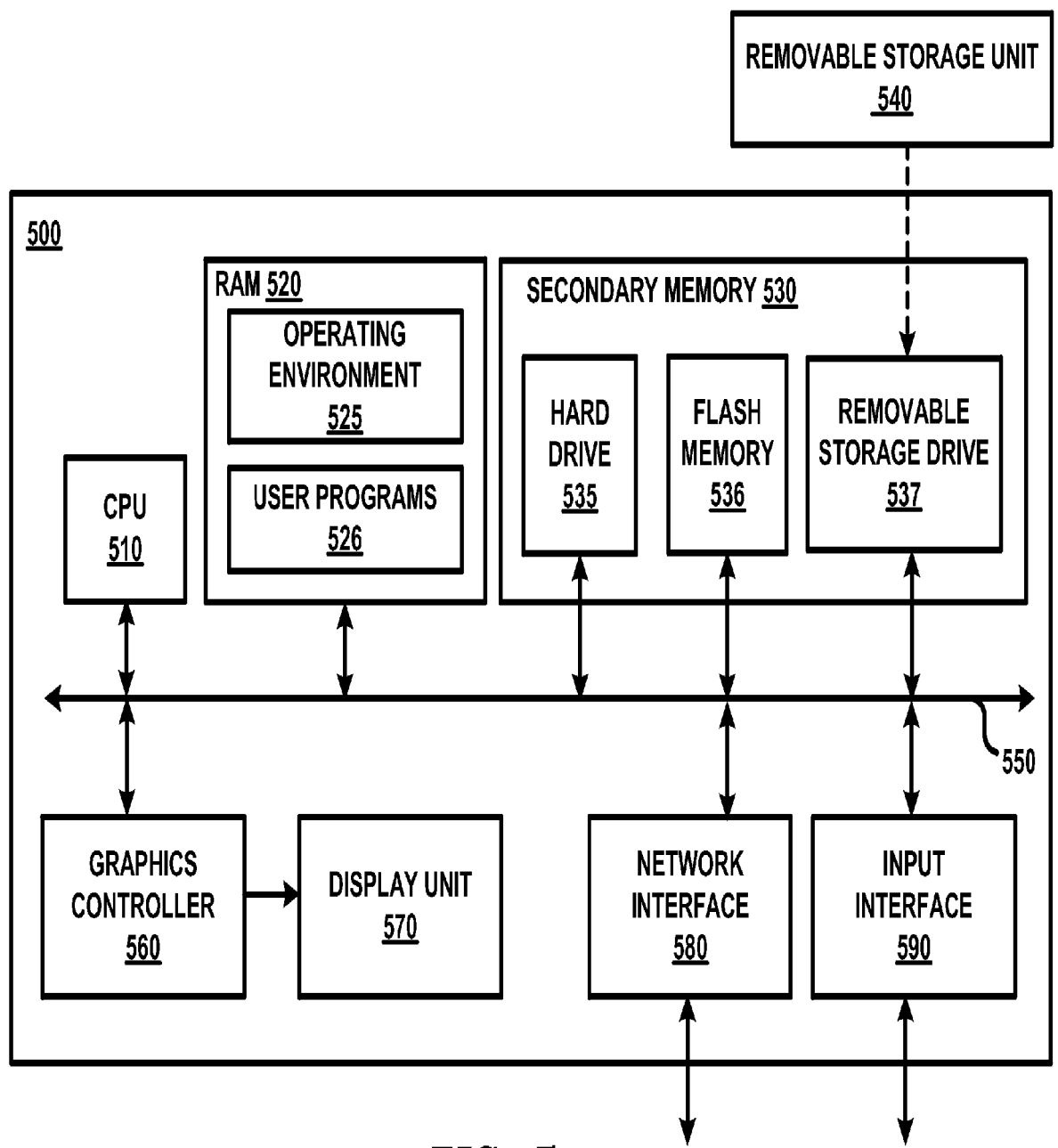
FIG. 5 is a block diagram illustrating the details of a digital processing system in which several embodiments can be implemented based on operation of software instructions.

FIG. 5 is a block diagram illustrating the details of a digital processing system (500) in which several embodiments of video encoder 100 of FIG. 1 can be implemented and operative by execution of appropriate execution modules containing processor instructions. Digital processing system 500 may contain one or more processors such as a central processing unit (CPU) 510, random access memory (RAM) 520, secondary memory 530, graphics controller 560, display unit 570, network interface 580, and input interface 590. All the components except display unit 570 may communicate with each other over communication path 550, which may contain several buses, as is well known in the relevant arts. The components of FIG. 5 are described below in further detail.

CPU 510 may execute instructions stored in RAM 520 to implement several of the embodiments described above. The instructions may include those executed by the various blocks of FIG. 1. CPU 510 may contain multiple processing units, with each processing unit potentially being designed for a specific task. Alternatively, CPU 510 may contain only a single general-purpose processing unit.

RAM 520 may receive instructions from secondary memory 530 via communication path 550. RAM 520 is shown currently containing software instructions constituting operating environment 525 and user programs 526 (such as are executed by the blocks of FIG. 1). The operating environment contains utilities shared by user programs, and such shared utilities include operating system, device drivers, etc., which provide a (common) run time environment for execution of user programs/applications.

Graphics controller 560 generates display signals (e.g., in RGB format) to display unit 570 based on data/instructions received from CPU 510. Display unit 570 contains a display screen to display the images defined by the display signals. Input interface 590 may correspond to a keyboard and a pointing device (e.g., touch-pad, mouse), and may be used to provide inputs. Network interface 580 provides connectivity (by appropriate physical, electrical, and other protocol interfaces) to a network (not shown, but which may be electrically connected to path 199 of FIG. 1), and may be used to communicate with other systems connected to the network.

Secondary memory 530 contains hard drive 535, flash memory 536, and removable storage drive 537. Secondary memory 530 may store data and software instructions, which enable digital processing system 500 to provide several features in accordance with the description provided above. The blocks/components of secondary memory 530 constitute computer (or machine) readable media, and are means for providing software to digital processing system 500. CPU 510 may retrieve the software instructions, and execute the instructions to provide several features of the embodiments described above.

Some or all of the data and instructions may be provided on removable storage unit 540, and the data and instructions may be read and provided by removable storage drive 537 to CPU 510. Floppy drive, magnetic tape drive, CD-ROM drive, DVD Drive, Flash memory, removable memory chip (PCMCIA Card, EPROM) are examples of such removable storage drive 537.

Removable storage unit 540 may be implemented using medium and storage format compatible with removable storage drive 537 such that removable storage drive 537 can read the data and instructions. Thus, removable storage unit 540 includes a computer readable (storage) medium having stored therein computer software and/or data. However, the computer (or machine, in general) readable medium can be in other forms (e.g., non-removable, random access, etc.).

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A method comprising:
    determining, by one or more processors, a first quantization scale for each picture in a segment of pictures;
    receiving short term bit rates, a frame rate, and a size of the segment of pictures;
    determining, by the one or more processors, a minimum bit rate for the segment and a maximum bit rate for the segment based on the short term bit rates, the frame rate, and the size;
    determining, by the one or more processors and based on the minimum bit rate and the maximum bit rate, a second quantization scale for each picture in the segment of pictures;
    determining, by the one or more processors, a third quantization scale for each picture in the segment of pictures, wherein the third quantization scale is based on a comparison between the first quantization scale and the second quantization scale of each picture in the segment of pictures; and
    encoding, by the one or more processors, each picture in the segment of pictures using the third quantization scale of each picture in the segment of pictures.

2. The method of claim 1, wherein: the first quantization scale is based on an average bit rate.

3. The method of claim 1, wherein: the second quantization scale is determined based on a total number of bits for the segment of pictures.

4. The method of claim 3, wherein: the total number of bits does not exceed a maximum number of bits for the segment of pictures.

5. The method of claim 1, wherein the encoding further includes:
   obtaining a minimum number of bits for encoding the segment of pictures;
   identifying that a total number of bits used to encode the segment of pictures is less than the minimum number of bits; and
   adding a number of filler bits to the total number of bits such that the encoding of the segment of pictures is performed using the minimum number of bits.

6. The method of claim 1, wherein determining the first quantization scale for each picture in the segment of pictures includes:
   determining the first quantization scale for a first picture in the segment of pictures; and
   determining the first quantization scale for a second picture in the segment of pictures, wherein the first quantization scale for the first picture is different than the first quantization scale for the second picture.

7. The method of claim 6, wherein determining a second quantization scale for each picture in the segment of pictures includes:
   determining the second quantization scale for the first picture in the segment of pictures; and
   determining the second quantization scale for the second picture in the segment of pictures, wherein the second quantization scale for the first picture is different than the second quantization scale for the second picture.

8. A system comprising:
   an average controller configured to:
     determine a first quantization scale for each picture in a segment of pictures;
   a min-max controller configured to:
     receive short term bit rates, a frame rate, and a size of the segment of pictures;
     determine, based on the short term bit rates, the frame rate, and the size, a minimum bit rate for the segment and a maximum bit rate for the segment; and
     determine, based on the minimum bit rate and the maximum bit rate, a second quantization scale for each picture in the segment of pictures;
   a max operator configured to:
     perform a comparison the first quantization scale and the second quantization scale of each picture in the segment of pictures to generate a third quantization scale; and
   an encoder configured to:
     receive the third quantization scale; and
     encode each picture in the segment of pictures using the third quantization scale.

9. The system of claim 8, wherein:
   the average controller receives a desired average; and
   the average controller determines the first quantization scale for each picture based on the desired average.

10. The system of claim 8, wherein:
    the second quantization scale is determined based on a total number of hits for the segment of pictures.

11. The system of claim 10, wherein:
    the total number of bits does not exceed a maximum number of bits for the segment of pictures.

12. The system of claim 8, wherein the encoder is further configured to:
    obtaining a minimum number of bits for encoding the segment of pictures;
    identifying that a total number of bits used to encode the segment of pictures is less than the minimum number of bits; and
    adding a number of filler bits to the total number of bits such that the encoding of the segment of pictures is performed using the minimum number of bits.

13. The system of claim 8, wherein the average controller is configured to determine the first quantization scale for each picture in the segment of pictures by:
    determining the first quantization scale for a first picture in the segment of pictures; and
    determining the first quantization scale for a second picture in the segment of pictures, wherein the first quantization scale for the first picture is different than the first quantization scale for the second picture.

14. The system of claim 13, wherein the min-max controller is configured to determine the second quantization scale for each picture in the segment of pictures by:
    determining the second quantization scale for the first picture in the segment of pictures; and
    determining the second quantization scale for the second picture in the segment of pictures, wherein the second quantization scale for the first picture is different than the second quantization scale for the second picture.

15. An encoder comprising:
    one or more processors, the one or more processors configured to:
    determine a first quantization scale for each picture in a segment of pictures;
    receive short term bit rates, a frame rate, and a size of the segment of pictures;
    determine a minimum bit rate for the segment and a maximum bit rate for the segment based on the short term bit rates, the frame rate, and the size;
    determine, based on the minimum bit rate and the maximum bit rate, a second quantization scale for each picture in the segment of pictures;
    determine a third quantization scale for each picture in the segment of pictures, wherein the third quantization scale is based on a comparison between the first quantization scale and the second quantization scale of each picture in the segment of pictures; and
    encode each picture in the segment of pictures using the third quantization scale of each picture in the segment of pictures.

16. The encoder of claim 15, wherein:
    the first quantization scale is based on an average bit rate.

17. The encoder of claim 15, wherein:
    the second quantization scale is determined based on a total number of bits for the segment of pictures.

18. The encoder of claim 17, wherein:
    the total number of bits does not exceed a maximum number of bits for the segment of pictures.

19. The encoder of claim 15, wherein the one or more processors are configured to:
    obtain a minimum number of bits for encoding the segment of pictures;
    identify that a total number of bits used to encode the segment of pictures is less than the minimum number of bits; and add a number of filler bits to the total number of bits such that the encoding of the segment of pictures is performed using the minimum number of bits.

20. The encoder of claim 15, wherein the one or more processors are configured to determine the first quantization scale for each picture in the segment of pictures by:
- determining the first quantization scale for a first picture in the segment of pictures; and
- determining the first quantization scale for a second picture in the segment of pictures, wherein the first quantization scale for the first picture is different than the first quantization scale for the second picture.

* * * * *